May 16, 1961  L. O. GATES, SR  2,984,269
SUPPORTING LINK AND TOOTH ASSEMBLY FOR CHAIN SAW CHAINS
Filed May 2, 1960
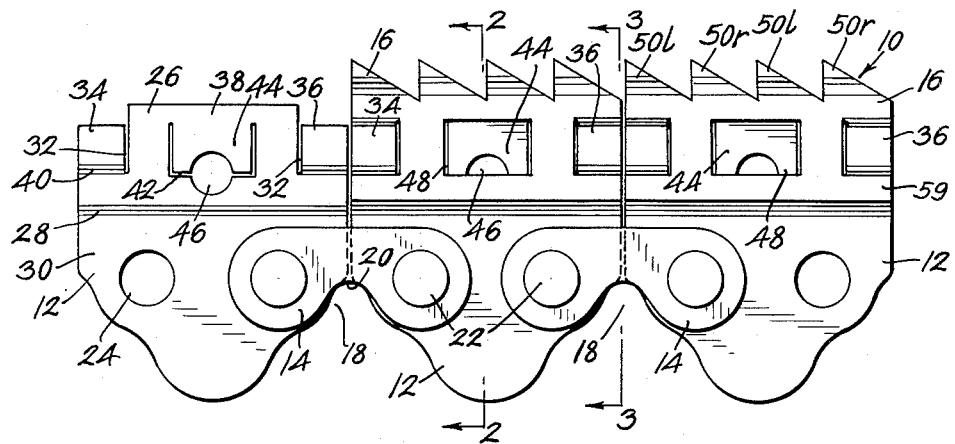
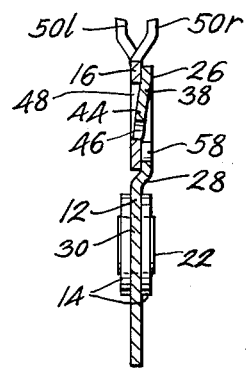
FIG. 2.
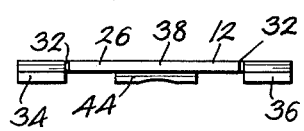
FIG. 4.
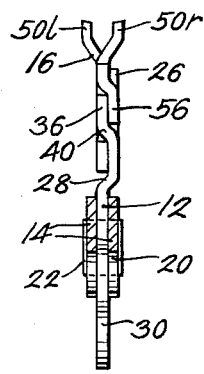
FIG. 3.
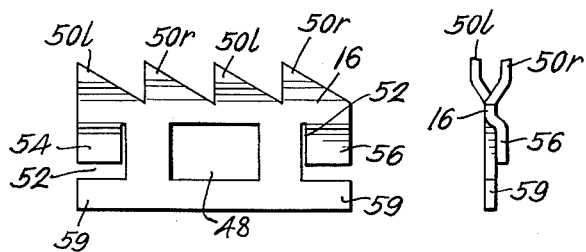
FIG. 6.   FIG. 7.
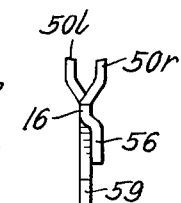
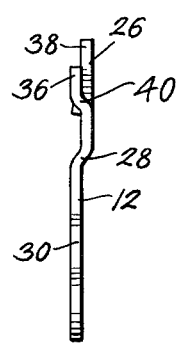
FIG. 5.
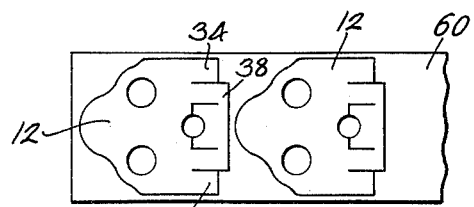
FIG. 8.
INVENTOR.
LEE O. GATES, SR.
BY
ATTORNEYS

United States Patent Office 2,984,269
Patented May 16, 1961

2,984,269
SUPPORTING LINK AND TOOTH ASSEMBLY FOR CHAIN SAW CHAINS

Lee O. Gates, Sr., 470 S. Bryant St., Denver, Colo.

Filed May 2, 1960, Ser. No. 26,183

6 Claims. (Cl. 143—135)

This invention relates to chain saws and, more particularly, to chain saw toothed elements and the tooth-supporting links therefor.

In my co-pending application Serial Number 710,155, filed January 20, 1958, I disclose an improved chain saw toothed element and link supporting structure therefor that is characterized by a plurality of oppositely bent tongues along the top edge of the tooth supporting link that cooperate with one another to define an open-topped channel closed at the rear end which is adapted to slidably receive and retain a removable saw tooth. While this structure is entirely satisfactory from the operational standpoint, it is somewhat expensive and I have now discovered another means for accomplishing the same result at much less cost due to the fact that both the toothed element and supporting link are fabricated from stamped metal parts. It is this latter construction which forms the subject matter of the present invention. In addition to the substantial savings in manufacturing costs that can be accomplished through the use of the instant link and tooth assembly for chain saws, it has certain other distinct advantages which should be mentioned briefly. First of all, the supporting link and toothed element are securely locked together by a positive spring latch that insures against their becoming separated from one another while in use; yet, a screw driver or pocket knife blade is the only tool required to instantly trip the spring latch and enable the toothed element to be removed for sharpening or replacement.

Furthermore, the interlocking portions of the toothed element and link are so designed and constructed that they cooperate in maintaining the teeth in properly aligned relation for a smooth even cut. This feature is, of course, essential in a chain saw to prevent the teeth and chain from breaking and possibly even damage to the drive engine.

It is, therefore, the principal object of the present invention to provide a novel and improved toothed element and supporting link assembly for chain saws.

A second object is the provision of an assembly of the type described in which both the toothed elements and supporting links used therewith are inexpensive stamped metal parts that effect a substantial reduction in the overall cost of the saw and, especially, replacement parts for the chain.

Another object is the provision of a saw toothed element and associated supporting link structure that are detachably interconnected by a positive spring latch that effectively prevents accidental separation thereof while in use yet makes the toothed element able to be removed rapidly and easily for sharpening or replacement.

Still another objective is to provide a chain for chain saws in which the links and saw toothed elements supported thereby cooperate to maintain the teeth in the proper alignment required for a smooth even cut.

Further objects of the instant invention are to provide a toothed element and supporting link assembly therefor that is simple to manufacture, easy to operate even insofar as the removal and interchange of toothed elements is concerned, rugged, compact, lightweight and effective for the purpose for which it was designed.

Other objects will be in part apparent and in part pointed out specifically hereinafter in connection with the description of the drawings that follows and in which;

Figure 1 is a side elevation of a short section of chain saw chain showing the improved saw toothed elements and supporting links therefor of the present invention interconnected by conventional connecting links;

Figure 2 is a section taken along line 2—2 of Figure 1 illustrating the spring latch by which the toothed elements are detachably connected to their associated supporting link;

Figure 3 is a section taken along line 3—3 of Figure 1;

Figure 4 is a top edge view of the supporting link;

Figure 5 is a rear edge view of the supporting link;

Figure 6 is a side elevation of the toothed elements;

Figure 7 is a rear edge view of the toothed elements; and,

Figure 8 is a plan view to a reduced scale indicating the manner in which the supporting links can be stamped from a length of strap metal.

Referring now to the drawings for a detailed description of the present invention, and particularly to Figure 1 thereof for this purpose, it will be seen that the chain saw chain which has been indicated in a general way by reference numeral 10 comprises a plurality of identical tooth-supporting links 12 arranged in end-to-end relation and interconnected to one another by means of connecting links 14, and toothed elements 16 detachably mounted on each of the tooth supporting links. The lower or inside edge 18 of each supporting link 12 is shaped in the conventional manner to define with the adjacent supporting links on either end thereof a notch 18 adapted to receive the teeth of a chain saw sprocket (not shown) and form a driving connection therewith. The connecting links 14 have a notch 20 on their lower edge intermediate the ends positioned to coincide with the apex of the notch 18 between the supporting links when pivotally connected to adjacent end portions of the latter by means of suitable fasteners 22. Fastener openings 24 are provided in both the supporting and connecting links adjacent opposite ends thereof adapted to pivotally receive the fasteners 22 with said supporting links arranged in end to end relation. Thus, it will be seen that the lower portion of the supporting links 12 and the entire connecting link 14 are both of conventional design and can be modified as required to suit different chain saw sprockets without departing from the true teaching of the instant invention.

The upper or outside portion 26 of the supporting links 12, on the other hand, is substantially different from the prior art structures for this purpose and will, therefore, be described in detail in connection with Figures 1, 4 and 5. First of all, it should be noted that upper portion 26 of the supporting link 12 is offset at 28 from the plane of the lower portion 30 approximately the thickness of toothed element 16 such that when said toothed element is placed alongside the offset upper portion in the assembled relation of Figure 1, it will be in substantially coplanar relation with the lower portion. The upper edge of upper portion 26 of each supporting link 12 is provided with a pair of longitudinally spaced substantially parallel slots 32 dividing said upper portion into front and rear tabs 34 and 36, respectively, separated from one another by a central secton 38. Tabs 34 and 36 are laterally offset at 40 so that they are repositioned in the plane of lower portion 30 as shown most clearly in Figure 5. The central section 38, on the other hand, remains offset in the plane of the remainder of upper portion 26.

Now, the central section 38 of the upper portion 26 of supporting links 12 is provided with a generally U-shaped slit 42 that frees a bendable spring tab 44 hinged along its upper edge. An opening 46 is preferably provided at the juncture between the lower margin of the tab 44 and the upper portion 26 to receive a latch-releasing tool.

Tab 44 is bent along its hinged edge out of the plane of the upper portion 26 and into the plane of the lower portion 30 and tabs 34 and 36 as shown most clearly in Figures 2 and 4. The metal from which supporting links 12 are stamped is selected such that tab 44 will spring back into the position indicated in Figure 2 whenever a force tending to return it into the plane of the upper portion 26 is released. This tab 44 cooperates with a registering opening 48 in the toothed element 16 to define a releasable spring latch which will be described in detail presently.

Now, with particular reference to Figures 1, 5 and 7 it will be seen that the toothed element 16 comprises a generally rectangular piece of metal having a row of saw teeth 50 formed along the upper edge thereof. Obviously, the number of teeth 50 provided in each toothed element may vary considerably depending upon the type of sawing to be done; however, when two or more teeth are provided on each toothed element, adjacent teeth are offset laterally in opposite directions from the plane of said toothed element in the same manner that conventional saw teeth are set. Thus, teeth 50r are offset to the right side of the plane of the toothed element as viewed in Figures 2, 3 and 7; whereas, teeth 50l are similarly offset to the left of said plane. Note in this connection that the degree of offset of the teeth is such that the saw cut produced thereby will receive and pass the connecting links 14 along with the heads of their associated fasteners 22.

The front and rear edges of the toothed element 16 contain generally L-shaped slits 52 located on opposite sides of the central opening 48 and beneath the teeth 50. These L-shaped slits 52 cooperate with the remainder of the toothed element to face front and rear tabs 54 and 56, respectively that remain attached to said element along their upper margins. Tabs 54 and 56 are offset laterally from the plane of the toothed element 16 into substantially the plane of teeth 50r or, more exactly, into the plane of the upper portion 26 of supporting link 12 when said toothed element is positioned thereagainst in the plane of the lower portion 30. Opening 48 in the center of the toothed element is located and sized to receive the tab 44 of the supporting link 12 when these elements are arranged in the aforementioned assembled relation.

Next, referring to Figures 1, 2 and 3, it can be seen that tabs 34 and 36 on the supporting links 12 cooperate with the similarly located tabs 54 and 56 of the toothed element to produce an overlapping relationship that is effective to prevent relative longitudinal movement between these elements due to their front or rear edges abutting a corresponding edge of the other element when in assembled relation. Relative tiltable movement of the toothed element on the supporting link is effectively prevented in one direction by the central section 58 of the supporting link engaging the opposed face of the toothed element while the tabs of the latter lock behind the tabs of the former; and, in the other direction by reason of the overlapping tabs and the fact that the ears 59 remaining underneath the tabs of the toothed element cooperate with the overlapping tabs of the supporting link as clearly shown in Figure 3. Thus, the toothed elements are held in substantial alignment with one another as a result of their novel interlocking engagement with the supporting links. Relative movement of the toothed elements in a direction to separate them from their associated supporting links is prevented by the releasable latch provided by tab 44 of said supporting link springing into place within the registering opening 48 in said toothed element such that their adjacent lower edges engage one another in the manner indicated in Figure 2. Release of the toothed element is accomplished by insertion of a suitably-formed tool into the opening 46 in tab 44 and prying against the supporting link until said tab returns into the plane of the upper section 26 whereupon said toothed element can be easily detached.

Finally, with brief reference to Figure 8, it can be seen that the supporting links 12 can easily be stamped from a length of strap metal 60 of proper width and thickness with little waste of material and at a relatively low cost. The same procedure obviously may be used in the fabrication of the connecting links and toothed elements of the assembly.

Having thus described the several useful and novel features of the saw tooth and tooth-supporting links structure for chain saws of the present invention, it will be apparent that the many worthwhile objectives for which they were designed have been achieved. Although but a single specific embodiment of the instant invention has been illustrated in the accompanying drawings, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A chain for chain saws comprising, a plurality of tooth-supporting links, at least one connecting link interconnecting adjacent ends of each pair of tooth-supporting links for relative pivotal movement in continuous end-to-end substantially coplanar relation, and a toothed element detachably connected to the outside edge of each tooth-supporting link in saw-forming relation to one another, the tooth-supporting links having first and second substantially planar portions laterally offset from one another along a line extending from end-to-end thereof by an amount approximately equal to the thickness of the toothed element, the first planar portion having the front and rear edges thereof angularly disposed relative to one another so as to define a sprocket-engaging tooth on the inside of the tooth-supporting link, the second planar portion having a pair of spaced substantially parallel slots in the outer edge thereof defining front and rear tabs separated by a central section, the tabs each being offset laterally into the plane of the first planar portion, the central sections having a generally U-shaped slit freeing a tab integrally hinged along its outer margin, the tax extending inwardly and laterally to a position where the inner edge thereof terminates in the plane of the first planar portion, the toothed element including at least one laterally offset saw tooth on the outside edge thereof and a planar portion along the inside edge substantially coextensive with the second planar portion of the tooth-supporting link, the planar portion of the toothed element having generally L-shaped slits in the front and rear edges thereof defining tabs integrally connected along their outside edges and a central opening located between the tabs receiving the central tab of the tooth-supporting link, the front and rear tabs of the toothed element being laterally offset from the plane of the planar portion thereof into the plane of the second planar portion of the tooth-forming link, the front and rear tabs of the toothed element cooperating with the front and rear tabs of the tooth-supporting link in interlocked overlapping relation to prevent relative longitudinal and tiltable movement therebetween, and the central opening within the toothed element cooperating with the central tab of the tooth-supporting link to produce a latch to maintain said element and said link in assembled relation.

2. The chain for chain saws as set forth in claim 1 in which, the second planar portion of the tooth-supporting link includes an opening located to intersect the transverse leg of the U-shaped slit thus defining means adapted to receive a pry-type tool for the purpose of bending the central tab into position whereby the toothed structure can be released therefrom.

3. The chain for chain saws as set forth in claim 1 in which, the tooth-supporting link is formed from spring metal, the central tab thereof thus forming a bendable spring latch.

4. The chain for chain saws as set forth in claim 1 in which, the planar portion of the toothed element includes ears extending in the direction of the ends along the inside edge underneath the corresponding tabs, said ears being positioned and adapted to underlie the corresponding tabs on the tooth-supporting link when said link and toothed element are in assembled relation.

5. A link and tooth assembly for chain saw chains which comprises, a tooth-supporting link having a sprocket-engaging tooth formed on one edge thereof and the opposite edge provided with a pair of laterally offset tabs arranged in a common plane and located at opposite ends with their free edges extending in the opposite direction to the sprocket-engaging tooth, and a central section separating the tabs including a third tab extending toward the sprocket-engaging tooth with a free edge terminating in the plane of the pair of tabs, and a toothed element having one edge provided with at least one saw tooth and the opposite edge including a second pair of laterally offset tabs arranged in a common plane and located at opposite ends thereof passed behind the first-mentioned pair of tabs carried by the tooth-supporting element and cooperating therewith to prevent relative longitudinal and tiltable movement therebetween, and said toothed element having an opening between the tabs receiving the third tab of the tooth-supporting link and forming therewith a releasable latch to maintain said link and toothed element in assembled relation.

6. The link and tooth assembly for chain saw chains as set forth in claim 5 in which the tooth-supporting link is formed from spring metal, the third tab thus forming a bendable spring latch element.

References Cited in the file of this patent

UNITED STATES PATENTS

| | | |
|---|---|---|
| 1,979,001 | Kankos | Oct. 30, 1934 |
| 2,280,778 | Andersen | Apr. 28, 1942 |
| 2,497,523 | Warkentin | Feb. 14, 1950 |
| 2,852,048 | Cox | Sept. 16, 1958 |
| 2,931,674 | Davies | Apr. 5, 1960 |